April 21, 1931. E. ELLINGSON Re. 18,051

DOOR SECURING DEVICE

Original Filed Jan. 16, 1928

INVENTOR.
ELLING ELLINGSON.
By Arthur L. Slee
HIS ATTORNEY.

Reissued Apr. 21, 1931 Re. 18,051

UNITED STATES PATENT OFFICE

ELLING ELLINGSON, OF SAN FRANCISCO, CALIFORNIA

DOOR-SECURING DEVICE

Original No. 1,744,456, dated January 21, 1930, Serial No. 247,217, filed January 16, 1928. Application for reissue filed February 3, 1931. Serial No. 513,210.

My invention relates to improvements in securing devices for doors and the like wherein a hasp mounted upon the jamb of a door is arranged to be moved to an inoperative position folded against the jamb and extended to an operative position engaging the knob of the door to permit a limited opening of the door and at the same time secure the door against an unauthorized opening sufficient to admit the entrance of a person through the door.

The primary object of my invention is to provide an improved door securing hasp.

Another object is to provide an improved device which may be folded to an inconspicuous inoperative position and which may be easily and quickly moved to operative position.

A further object is to provide an improved device of the character described which will permit a limited opening of a door for the purpose of ventilation or to permit observation past the door, but which will effectually bar the door against further opening.

A still further object is to provide an improved device of simple and economical construction which may be easily applied in connection with a door.

The invention consists of the improved details of construction and arrangement disclosed in the drawings forming a part of the present application wherein like characters of reference are used to designate similar parts throughout the specification and drawings, and in which:—

Figure 1:
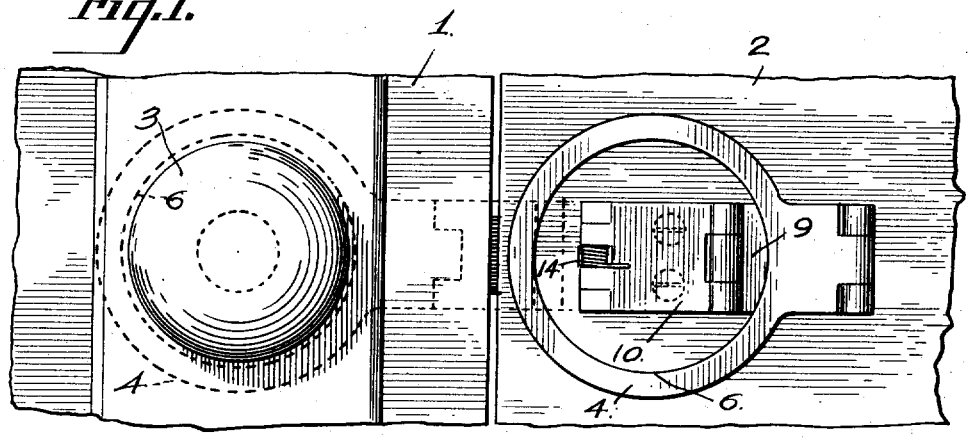
Fig. 1 is a broken front elevation of a portion of a door and jamb, showing the application of my improved securing device thereon.

Referring to the drawings, the numeral 1 is used to designate in general a door mounted adjacent a jamb 2 and provided with a door knob 3 of the ordinary form. My improved securing device consists of a knob engaging member 4 having a central aperture 6 arranged to permit the member 4 to be moved over the knob 3. A jamb plate 7 is secured upon the jamb 2 opposite the knob 3 by means of screws 8 or other suitable securing means. The apertured member 4 is connected to the jamb plate 7 by means of links 9 and 10 hingedly connected to each other as at 11 and to the apertured member and the jamb plate respectively by hinge connections 12 and 13. A spring 14 is mounted upon the pintle of the hinge connection 13 and arranged to exert a normal pressure tending to move the link 10 to a position folded back away from the door 1 and against the jamb plate 7.

Figure 2:
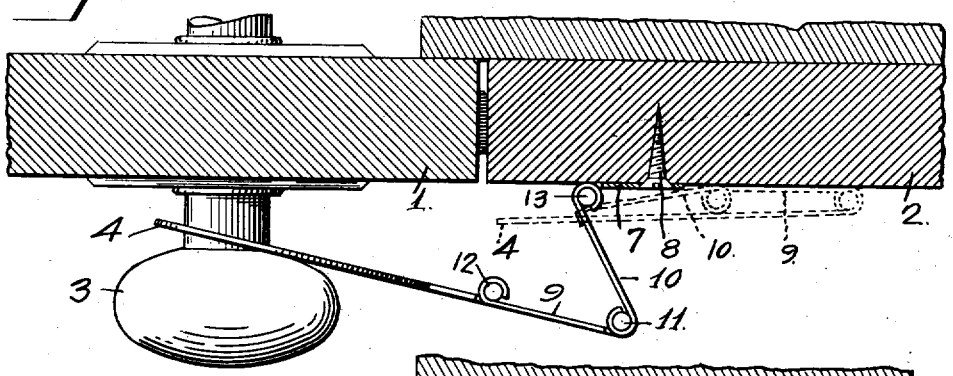
Fig. 2 is a sectional view of the door and jamb showing my securing device in operative engagement with the knob, the door being in fully closed position.

In operation, my improved securing device is mounted upon the jamb in a position directly opposite to the knob 3 and at a distance from the edge of the door such that when the apertured member 4 and links 9 and 10 are folded back in substantially parallel relation against the jamb as shown in full lines in Fig. 1 and in dotted lines in Fig. 2 of the drawings, the hasp will occupy an inconspicuous inoperative position clear of the edge of the door. To secure the door, the hasp is moved from its inoperative position and the apertured member 4 is moved over the knob 3 as indicated in dotted lines in Fig. 1 of the drawings. When the hasp is now released the spring 14 tends to move the link 10 back toward its inoperative position, thereby pulling the apertured member 4 into engagement with the stem of the knob 3 as shown in full lines in Fig. 2 of the drawings. The tension of the spring holds the member 4 in engagement with the knob 3 and effectually prevents displacement of said member by a blow struck against the outer side of the door or knob.

Figure 3:
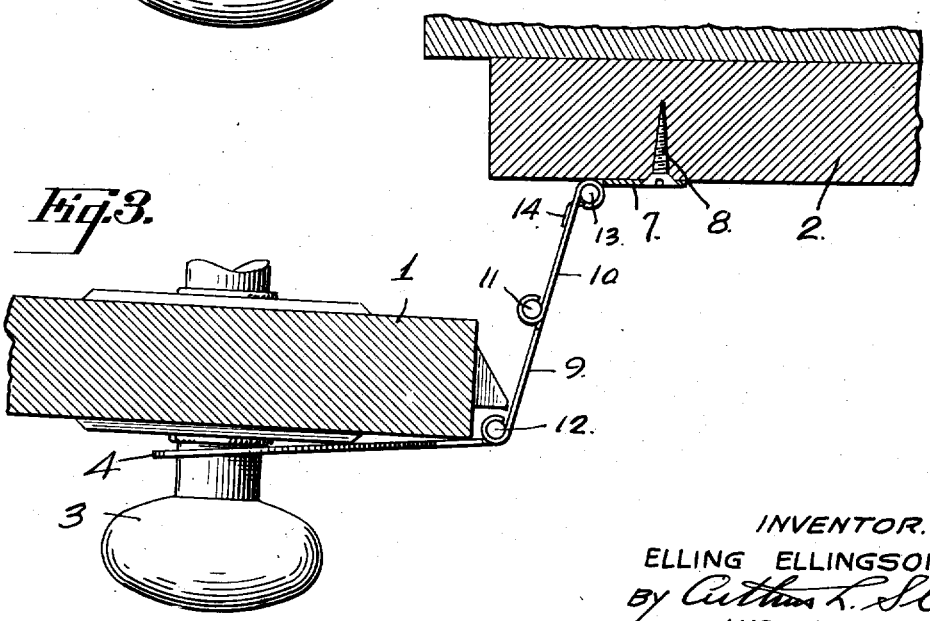
Fig. 3 is a view similar to Fig. 2 with the door moved to its limited open position.

If it is desired to open the door slightly, either for purpose of ventilation or to permit a person inside the door to observe persons or objects outside the door, the knob may be turned within the apertured member 4 and the door opened to the limited position shown in Fig. 3 of the drawings. When thus opened, the door cannot be further opened by a person upon the outside, thereby barring the entrance of an unauthorized person even when the door is partially opened. The limited opening of the door also permits observation of a person seeking admission without unfastening the door to an extent such as to afford an opportunity to force an entry when the door is unlatched, thus affording safety to a person who otherwise might be overpowered by an intruder. It will be noted that the knob is readily turnable within the member 4 to permit the unlatching of the door without displacing the securing device, and also that the member 4 is effectually held in operative engagement with the knob until intentionally released and moved from inside of the door to an inoperative position. The plurality of hinged links affords compactness and insures a positive engagement with the knob while permitting a limited opening of the door.

Having thus described my invention what I claim as new and desire to secure by Letters Patent is:—

1. A door securing device comprising a hasp consisting of an apertured member arranged to be moved over the door knob of a door; a jamb plate arranged to be secured upon the door jamb adjacent the knob; a pair of links pivotally connected at their adjacent ends and pivotally connected at their opposite ends to the apertured member and the jamb plate respectively, said links being movable to proximate matching relation against said jamb plate to permit the apertured member to be folded back against the jamb into inoperative position, said links also being adapted to be extended to permit said apertured member to be moved into engagement with the knob and permit a limited opening only of the door.

2. A door securing device comprising a hasp consisting of an apertured member arranged to be moved over the door knob of a door; a jamb plate arranged to be secured upon the door jamb adjacent the knob; a pair of links hingedly connected at adjacent ends and pivotally connected at their opposite ends to the apertured member and the jamb plate respectively, said links being movable to proximate matching relation against the jamb plate to permit the apertured member to be folded back against the jamb into inoperative position, said links also being adapted to be extended to permit said apertured member to be moved into engagement with the knob and permit a limited opening only of the door; and means for normally moving the links in a direction away from the knob.

3. A door securing device comprising a hasp consisting of an apertured member arranged to be moved over the knob of a door; a jamb plate arranged to be secured upon the door jamb adjacent the knob; links hingedly connected, between the apertured member and the jamb plate and arranged to permit the apertured member to be folded back against the jamb into inoperative position and to be extended into engagement with the knob, said links being arranged to permit a limited opening of the door; and a spring mounted in connection with the jamb plate and the adjacent link and normally exerting a pressure tending to move said link in a direction away from the knob.

4. A door securing device comprising the combination with the knob and jamb of a door, of a hasp comprising an apertured member arranged to be moved over the knob; a jamb plate secured upon the jamb adjacent the knob; and a pair of links hingedly connected to each other and to the apertured member and sash plate to permit the apertured member to be folded back against the jamb into inoperative position and to be extended into engagement with the knob, said links being arranged to permit a limited opening of the door.

5. A door securing device comprising a hasp plate provided with an enlarged knob engaging portion having an opening therethrough of a diameter sufficient to pass over a door knob of ordinary size; and means hingedly connected to the hasp plate and to a door jamb adjacent to the ordinary standard door knob of a door, said means being movable to extend the hasp plate over the knob with said knob received within the opening of the plate whereby the door may be opened only a limited amount.

6. In a door securing device, a hasp plate having an opening of a size adapted to receive an ordinary door knob therethrough and permit a relatively wide range of movement of the hasp plate relative to a stem connecting said knob to a door; and means hingedly connected to said plate and to a door jamb adjacent the knob to hold said plate in alinement with the knob, said means being movable to permit movement of the plate into and out of engagement with the knob.

7. In a door securing device, the combination with a door provided with the usual door knob and stem, of a hasp plate having an opening of a diameter sufficiently large to pass over the knob and to afford a relatively wide range of movement transversely with respect to the stem of said knob; and link means hingedly connected at one end to the hasp plate and at the opposite end to a door jamb in alinement with said door knob, said means being movable to permit movement of the hasp plate onto and off from the knob, and also transversely relative to the stem when in engagement with the knob and stem, and also being movable to position the hasp in flat proximate relation to the plane of the door.

In witness whereof, I hereunto set my signature.

ELLING ELLINGSON.